US010789024B2

(12) United States Patent
Sasagawa

(10) Patent No.: US 10,789,024 B2
(45) Date of Patent: Sep. 29, 2020

(54) PRINTING APPARATUS AND RELATED CONTROL METHOD THAT, UPON RECEIPT OF A TURN-OFF INSTRUCTION, STOP POWER SUPPLY TO A FIRST CONTROLLER, WHICH CONTROLS A PRINT ENGINE, AND A SECOND CONTROLLER, WHICH INSTRUCTS THE FIRST CONTROLLER TO PRINT AND RECEIVES A POWER SUPPLY INSTRUCTION

(71) Applicant: CANON KABUSHIKI KAISHA, Tokyo (JP)

(72) Inventor: Naoto Sasagawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/117,220

(22) Filed: Aug. 30, 2018

(65) Prior Publication Data

US 2019/0073165 A1 Mar. 7, 2019

(30) Foreign Application Priority Data

Sep. 6, 2017 (JP) .................................. 2017-171377

(51) Int. Cl.
*G06F 3/12* (2006.01)
*G03G 15/00* (2006.01)

(52) U.S. Cl.
CPC ....... *G06F 3/1221* (2013.01); *G03G 15/5004* (2013.01); *G03G 15/5016* (2013.01);
(Continued)

(58) Field of Classification Search
CPC .... G06F 3/1221; G06F 3/1231; G06F 3/1287; G03G 15/5004; G03G 15/5016; G03G 15/5075

See application file for complete search history.

(56) References Cited

U.S. PATENT DOCUMENTS 7,113,294 B2 9/2006 Katsu
7,586,637 B2 9/2009 Eastment et al.
(Continued)

FOREIGN PATENT DOCUMENTS

JP 2000-280579 A 10/2000
JP 2003-054091 A 2/2003
(Continued)

OTHER PUBLICATIONS

Extended European Search Report dated Dec. 10, 2018, issued in European Patent Application No. 18189530.1.
(Continued)

*Primary Examiner* — Moustapha Diaby
(74) *Attorney, Agent, or Firm* — Venable LLP

(57) ABSTRACT

A printing apparatus includes a power supply that supplies power to hardware components in the printing apparatus, a print engine that prints an image, a first controller that controls the print engine to print the image and controls the power supply, and a second controller that instructs the first controller to print, and receives an instruction related to power supply control of the printing apparatus from an external terminal. Upon receiving a turn-off instruction for turning off the printing apparatus from the external terminal, the second controller notifies the first controller of the turn-off instruction, and the first controller controls, in accordance with the turn-off instruction received from the second controller, the power supply to stop supply of the power to both the first controller and the second controller, which has notified the turn-off instruction.

21 Claims, 16 Drawing Sheets

(52) U.S. Cl.
CPC ......... *G03G 15/5075* (2013.01); *G06F 3/121* (2013.01); *G06F 3/1231* (2013.01); *G06F 3/1234* (2013.01); *G06F 3/1287* (2013.01)

(56) References Cited

U.S. PATENT DOCUMENTS

| | | |
|---|---|---|
| 8,635,474 B2 | 1/2014 | Hayakawa |
| 8,934,791 B2 | 1/2015 | Eiki |
| 8,976,380 B2 | 3/2015 | Tanaka |
| 9,015,598 B2 | 4/2015 | Negoro |
| 9,507,489 B2 | 11/2016 | Negoro |
| 2005/0286069 A1 | 12/2005 | Eastment et al. |
| 2007/0165265 A1 | 7/2007 | Ito et al. |
| 2012/0233538 A1* | 9/2012 | Negoro ................... H04L 67/02 715/234 |
| 2013/0156447 A1* | 6/2013 | Eiki ................... G03G 15/2053 399/33 |
| 2014/0313537 A1* | 10/2014 | Imoto ................... G06F 3/1221 358/1.14 |
| 2017/0142280 A1* | 5/2017 | Koiwai ............. H04N 1/00899 |

FOREIGN PATENT DOCUMENTS

| | | |
|---|---|---|
| JP | 2006-203869 A | 8/2006 |
| JP | 2007-055025 A | 3/2007 |
| JP | 2011-112710 A | 6/2011 |
| JP | 2012-190326 A | 10/2012 |
| JP | 2013-080122 A | 5/2013 |
| JP | 2014-079941 A | 5/2014 |
| JP | 2016-126444 A | 7/2016 |
| JP | 2016-210093 A | 12/2016 |

OTHER PUBLICATIONS

Office Action dated Apr. 15, 2019, issued in Japanese Patent Application No. 2017-171377.

* cited by examiner

FIG 4
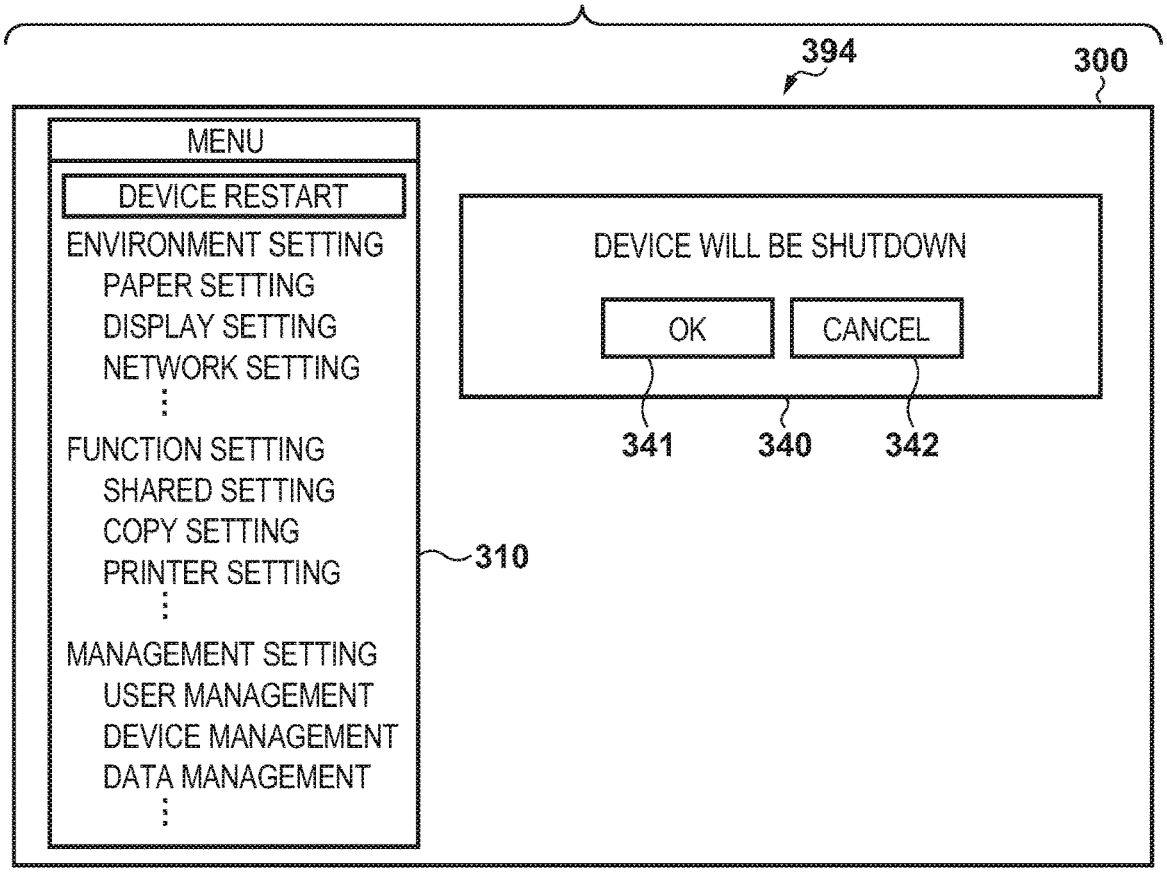
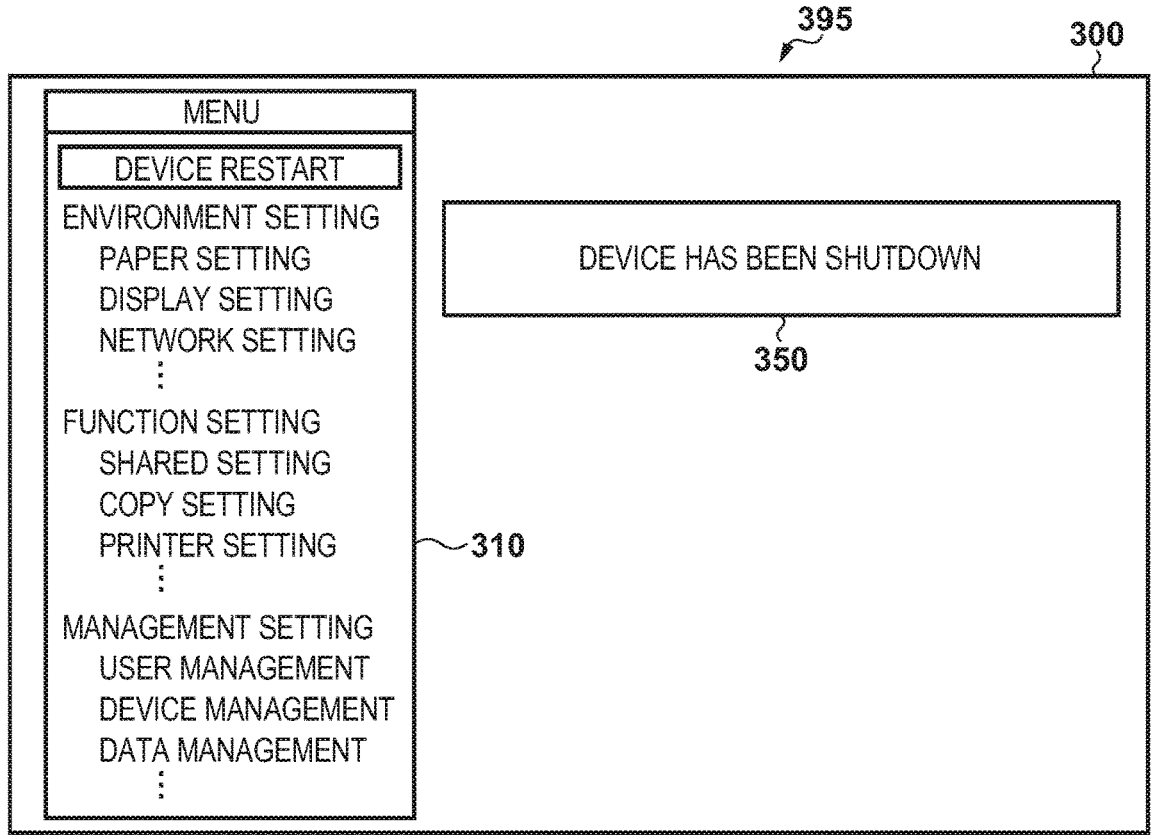

FIG 10
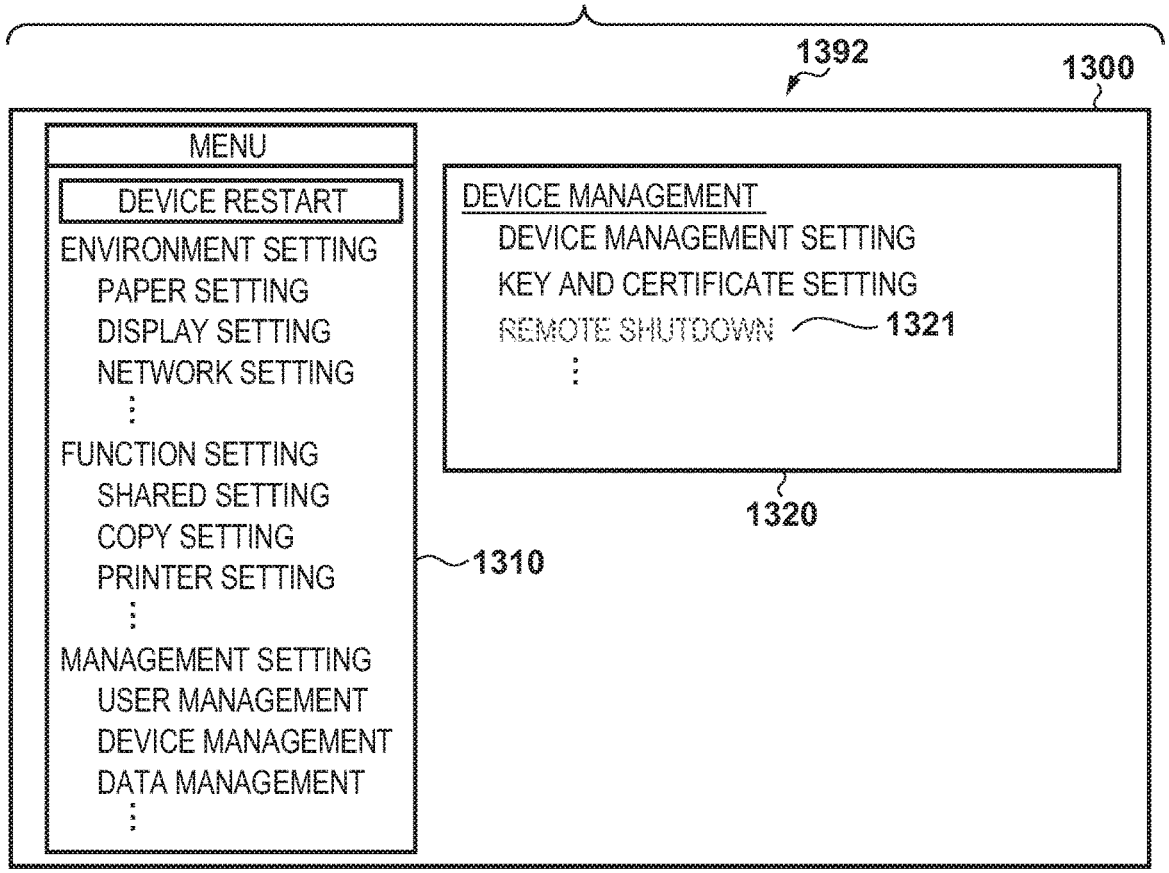
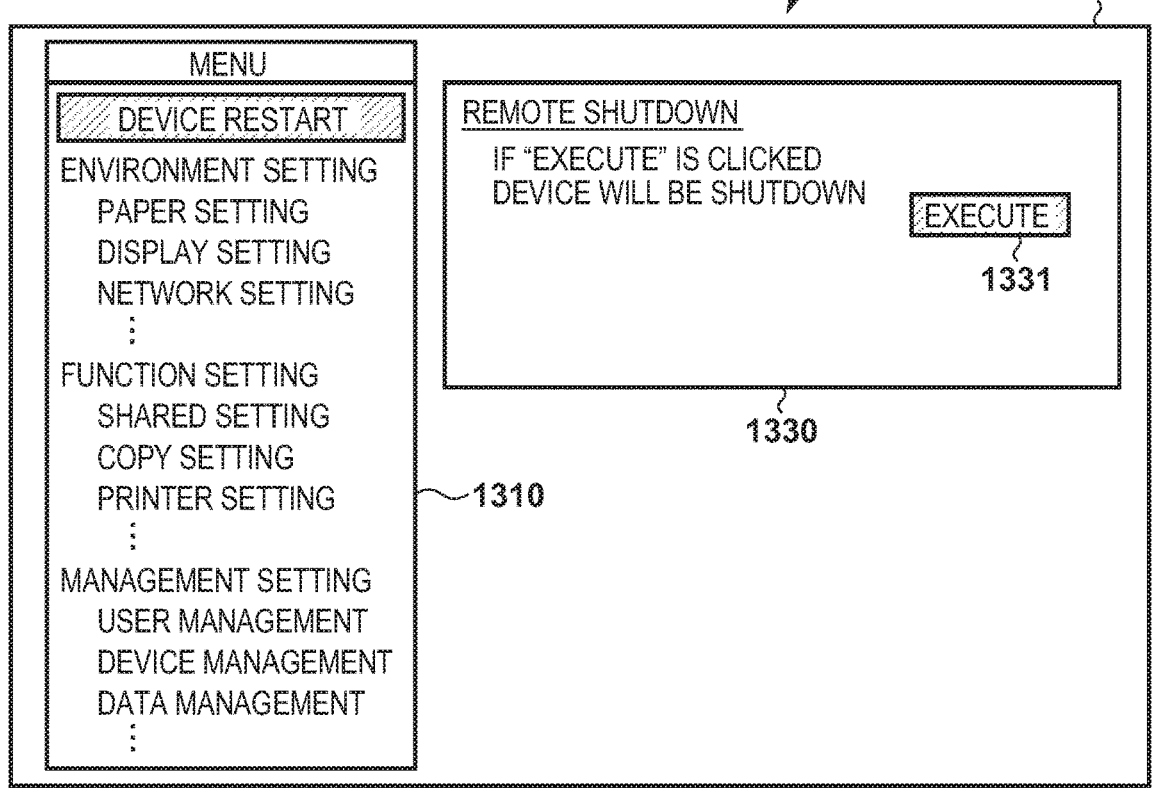

FIG. 11
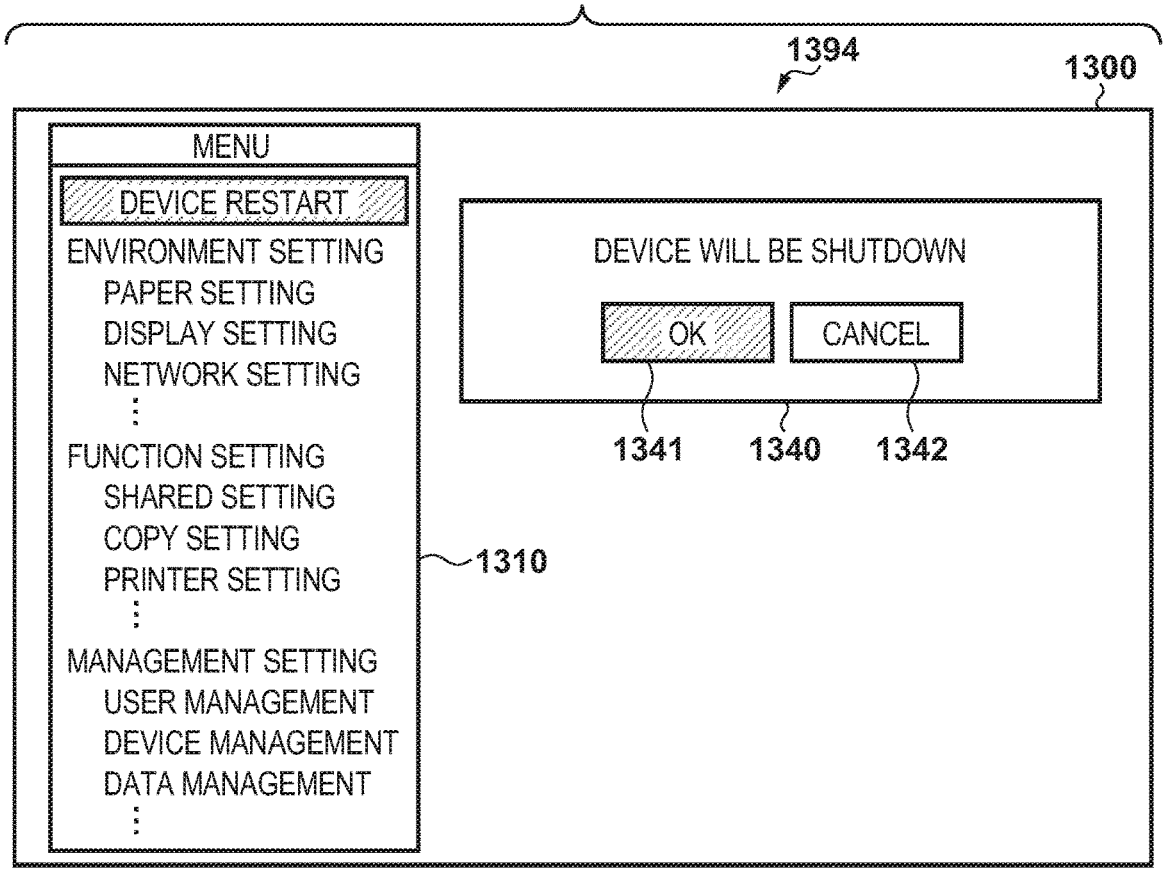
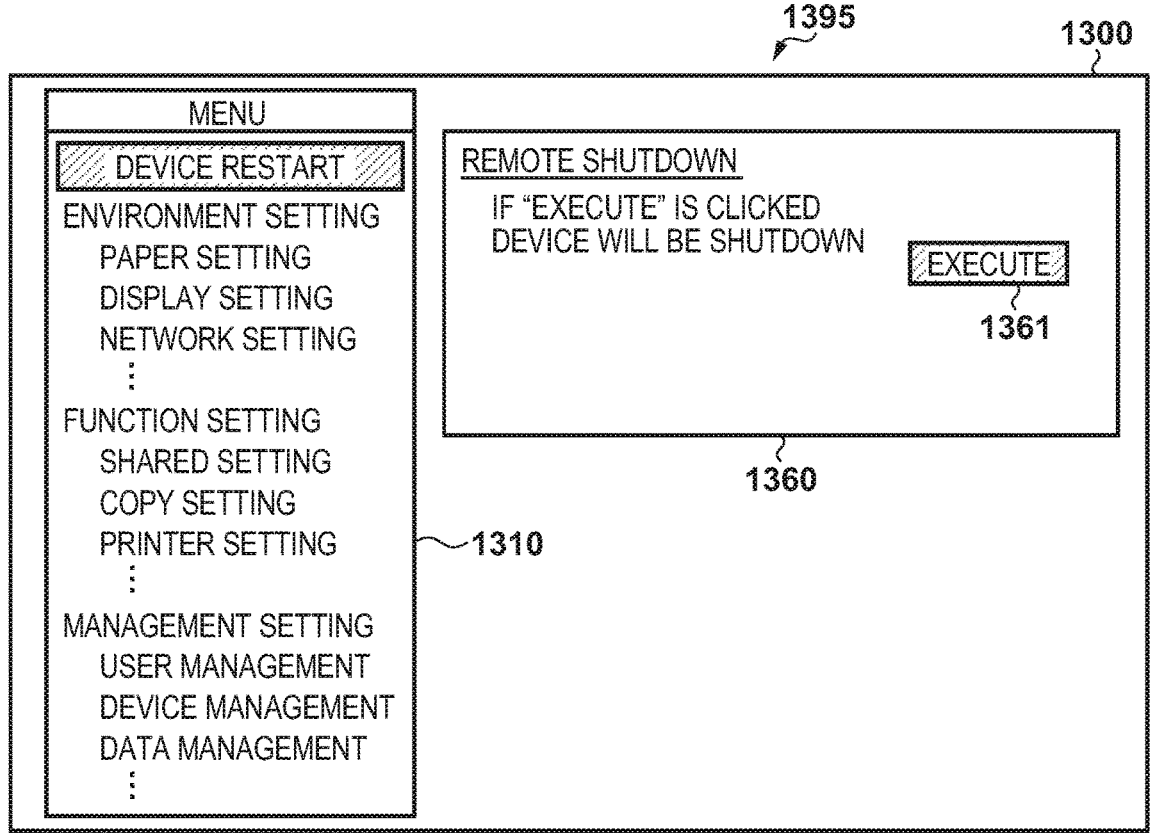

PRINTING APPARATUS AND RELATED CONTROL METHOD THAT, UPON RECEIPT OF A TURN-OFF INSTRUCTION, STOP POWER SUPPLY TO A FIRST CONTROLLER, WHICH CONTROLS A PRINT ENGINE, AND A SECOND CONTROLLER, WHICH INSTRUCTS THE FIRST CONTROLLER TO PRINT AND RECEIVES A POWER SUPPLY INSTRUCTION

This application claims the benefit of Japanese Patent Application No. 2017-171377, filed on Sep. 6, 2017, which is hereby incorporated by reference herein in its entirety.

BACKGROUND OF THE INVENTION

Field of the Invention

The present invention relates to a printing apparatus and a control method thereof.

Description of the Related Art

Usually, image forming apparatuses (printing apparatuses) have a print engine for outputting a digital image onto a paper device (recording medium), a control apparatus that includes a controller that executes a control program for controlling a job on the image forming apparatus, and a power supply. Operations of the print engine are controlled using a print engine control program. In addition, a power supply control program for controlling operations of the power supply is known regarding both the case of being included in the control program of the controller, and the case of being included in the print engine control program.

In a configuration in which the controller has the power supply control program, remote shutdown for shutting down the image forming apparatus can be performed according to an instruction from an external terminal. For example, Japanese Patent Laid-Open No. 2016-210093 proposes a mechanism for determining, via a network, whether or not shutdown processing has completed normally in a case in which the image forming apparatus is shut down through remote shutdown.

There is the following issue, however, in the conventional technique described above. For example, in a print engine that has a fixing unit and a cooling fan, a high-voltage power supply needs to be controlled. Therefore, in a configuration in which the controller has the power supply control program, the controller needs to be aware of the operations of the print engine at a remote position in order for the controller to control the power supply, and the sequence for control is complicated. Furthermore, in such a configuration, there is a risk that the control of power supply will be lost in cases such as where a failure occurs in communication between the controller and the print engine control program.

On the other hand, in a configuration in which the print engine control program includes the power supply control program, the state of the print engine is directly received by the power supply control program, and the power supply is controlled, and thus, the power supply can be easily controlled. In addition, the print engine control program and the power supply control program are processed by the same central processing unit (CPU), and thus, the print engine is unlikely to be affected by a failure in the surrounding region thereof, and it is possible to reduce the risk of a malfunction occurring in the print engine or the like. In such a configuration, however, techniques of remote control for performing a shutdown, restart, and the like, without directly operating an image forming apparatus, particularly in order to make it easy to manage a large number of image forming apparatuses, have not been proposed as of yet.

SUMMARY OF THE INVENTION

The present invention enables realization of a mechanism for suitably performing remote control in the case of performing power supply control in a print engine.

In one aspect, the present invention provides a printing apparatus comprising a power supply that supplies power to hardware components in the printing apparatus, a print engine that prints an image, a first controller that controls the print engine to print the image and controls the power supply, and a second controller that instructs the first controller to print, and receives an instruction related to power supply control of the printing apparatus from an external terminal, wherein, upon receiving a turn-off instruction for turning off the printing apparatus from the external terminal, the second controller notifies the first controller of the instruction, and the first controller controls the power supply to turn off the printing apparatus in accordance with the turn-off instruction.

In another aspect, the present invention provides a control method for a printing apparatus that comprises a power supply that supplies power to a print engine that prints an image, a first controller that controls the print engine to print the image, and a second controller that instructs the first controller to print and receives an instruction from an external terminal, the control method comprising receiving, by the second controller, a turn-off instruction for turning off the printing apparatus from the external terminal, notifying, by the second controller, the first controller of the turn-off instruction; and controlling, by the second controller, the power supply to turn off the printing apparatus in accordance with the notified turn-off instruction.

Further features of the present invention will be apparent from the following description of exemplary embodiments with reference to the attached drawings.

BRIEF DESCRIPTION OF THE DRAWINGS

FIG. 4 is a diagram showing a screen of an RUI of an image forming apparatus according to an embodiment.

FIG. 10 is a diagram showing a screen of an RUI of an image forming apparatus according to an embodiment.

FIG. 11 is a diagram showing a screen of an RUI of an image forming apparatus according to an embodiment.

DESCRIPTION OF THE EMBODIMENTS

Figure 1:
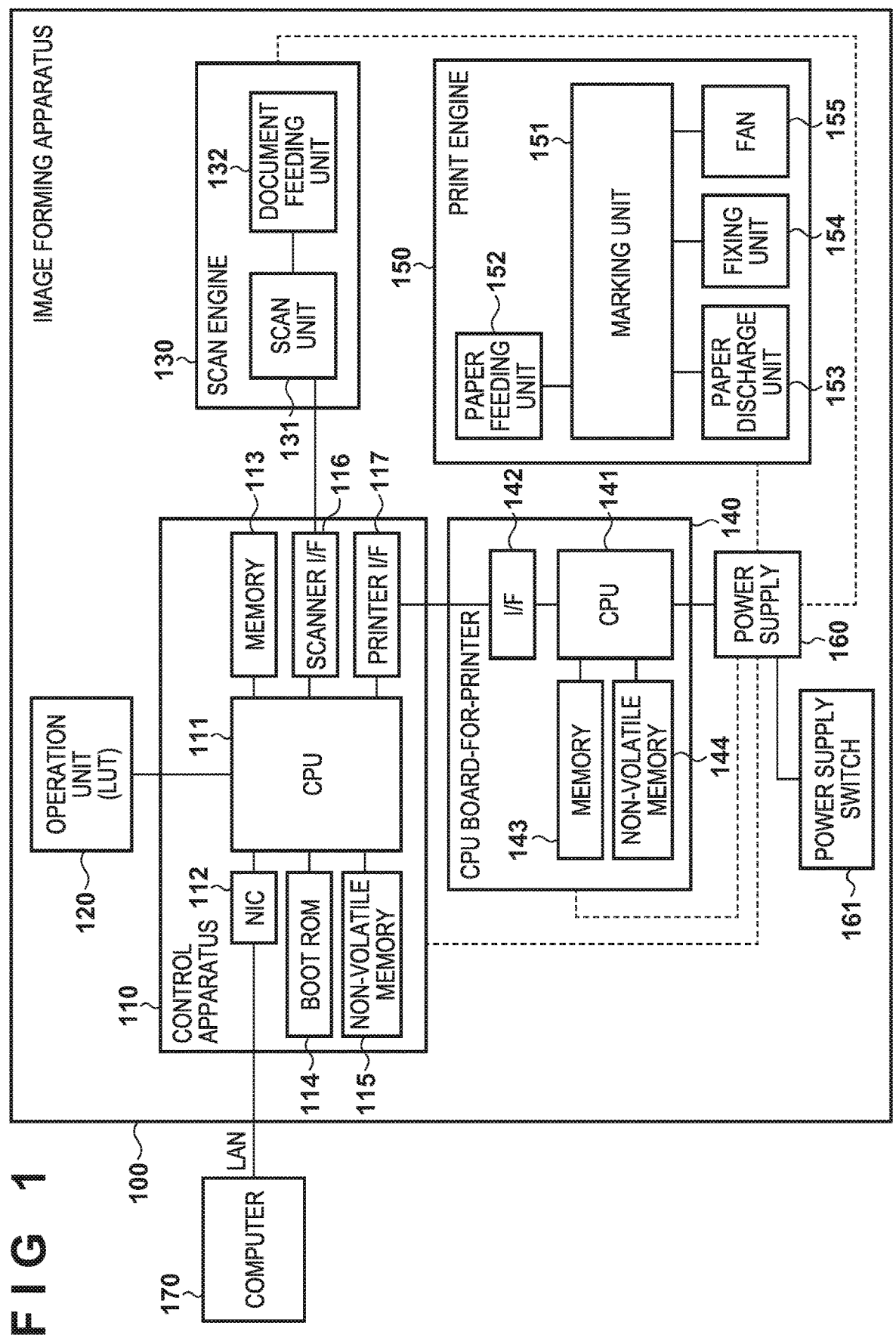
FIG. 1 is a diagram showing an image forming apparatus according to an embodiment of the present invention.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Image Forming Apparatus

A first embodiment of the present invention will be described below. First, the hardware configuration of an image forming apparatus (hereafter, also referred to as a printing apparatus) of this embodiment will be described with reference to FIG. 1. An image forming apparatus 100 is a so-called multi-function printer (MFP, also referred to as a multi-function peripheral) provided with a scan engine 130 and a print engine 150. In addition, the image forming apparatus 100 includes a control apparatus 110, an operation unit 120, a central processing unit (CPU) board-for-printer 140, a power supply 160, and a power supply switch 161.

The scan engine 130 includes a scan unit 131 and a document feeding unit 132, and transmits image data converted by the scan unit 131 to the control apparatus 110. The scan unit 131 can convert a document into a digital image by performing optical scanning. The document feeding unit 132 can automatically exchange document bundles sequentially. The print engine 150 includes a marking unit 151 for printing image data onto fed pieces of paper, a paper feeding unit 152 that can sequentially feed sheets of paper one by one from a paper bundle, and a paper discharge unit 153 for discharging printed paper. Furthermore, the print engine 150 includes a fixing unit 154 for fixing toner printed by the marking unit 151 by applying heat and pressure, and a cooling fan 155. The operation unit 120 is a local user interface (LUI) for operating this image forming apparatus 100.

The control apparatus 110 is an example of a system controller (a second controller) that integrally controls the image forming apparatus 100, and is connected to the above components. The control apparatus 110 is a different circuit board from the CPU board-for-printer 140. The control apparatus 110 and the CPU board-for-printer 140 are connected with each other via communication cables through which instructions and image data are transferred between the control apparatus 110 and the CPU board-for-printer 140. The controller implemented on the control apparatus 110 executes jobs on the image forming apparatus 100. The control apparatus 110 is a general-purpose CPU system, and includes a CPU 111 for controlling the entire CPU board, a memory 113 used as a work memory of the CPU 111, and a boot ROM 114 that includes a boot program. Furthermore, the control apparatus 110 includes a Network Interface Card (NIC) 112 for external connection via a network and a non-volatile memory 115 that includes firmware. The non-volatile memory 115 may be mounted on the CPU board, or may be connected to the CPU board. In addition to a control program of the CPU 111, information indicating the operation state of the CPU board-for-printer 140 that is an engine controller (a first controller) is stored in the non-volatile memory 115. In addition, the control apparatus 110 is connected to the scan engine 130 and the CPU board-for-printer 140 via a scanner I/F 116 and a printer interface I/F 117. For example, the control apparatus 110 may receive a print instruction and print data described in a page description language (PDL) from an external computer via the NIC 112, generate image data by rasterizing the print data, instruct the CPU board-for-printer 140 to print the generated image data, and transfer the generated image data to the engine controller 140 via the printer I/F 117. The CPU board-for-printer 140 outputs drive control signals to drive the printer engine 150 and the image data received from the control apparatus 110 to the printer engine 150. The print engine 150 drives the marking unit 151, the paper feeding unit 152, the paper discharge unit 153, the fixing unit 154, and the cooling fan 155 in accordance with the drive control signals so as to print the image data received from the CPU board-for-printer 140.

The CPU board-for-printer 140 controls a load that executes image formation communicating with the print engine 150. Also, the CPU board-for-printer 140 controls the power supply 160 that supplies power to constituent elements (e.g., the print engine 150, the system controller 110, the engine controller 140) of the image forming apparatus 100. The voltage of the power supplied to the print engine 150 may be higher than the voltage of the power supplied to the system controller 110 and the engine controller 140. The CPU board-for-printer 140 includes a CPU 141 for controlling the entire board, an I/F 142 that is connected to the printer I/F of the control apparatus 110, a memory 143 that is used as a work memory of the CPU 141, and a non-volatile memory 144. The CPU 141 is connected to the power supply 160, and controls the supply of power from the power supply 160, and performs power supply control in the image forming apparatus 100.

Dotted lines in FIG. 1 indicate power supply lines. The power supply 160 supplies power to the control apparatus 110, the scan engine 130, the CPU board-for-printer 140, and the print engine 150. The power supply switch 161 is a hardware switch for controlling ON/OFF of supply of power. When the power supply switch 161 is turned ON, the content of the boot ROM 114 is read out to the memory 113, and is sequentially processed by the CPU 111, and thus, various hardware settings and booting of an OS are executed. When the processing of the boot ROM 114 is complete, a job can be accepted and executed by the CPU 111 operating in accordance with a program (firmware) of the controller stored in the non-volatile memory 115.

The image forming apparatus 100 is connected to a computer 170, which is an external terminal, through the NIC 112 installed in the control apparatus 110, via a network, such that HyperText Transfer Protocol (HTTP) communication is possible. The image forming apparatus 100 can accept the input/output of digital image data, issuance of a job, an instruction to a device, and the like, from the computer 170.

Image Forming Operation

Next, an operation of the image forming apparatus 100 will be described. Here, a copy job (image copy using a paper device) will be described as an example of an operation of the image forming apparatus 100.

When the user requests the execution of a copy job through the operation unit 120, the CPU 111 of the control apparatus 110 accepts the request, and the CPU 111 starts calculation processing of a job control program. The CPU 111 performs calculation processing of a scan engine control program called by the job control program, and causes the scan engine 130 to read an image, via the scanner I/F 116. The scan engine 130 optically scans the paper document, converts the paper document into digital image data, and transmits the digital image data to the control apparatus 110. The digital image data is temporarily stored in the memory 113. When a certain region of the memory 113 is full of digital image data, the CPU 111 advances the calculation processing of the job control program, and calls a print engine communication program from the job control program. The CPU 111 performs the calculation processing of the print engine communication program, and transmits an image output instruction to the CPU 141 of the CPU board-for-printer 140 via the printer I/F 117.

The CPU 141 operates in accordance with a print engine control program, and causes the print engine 150 to perform printing in accordance with the image data. Toner printed onto a sheet by the marking unit 151 is fixed to the sheet by the fixing unit 154. The fixing unit 154 fixes the toner by applying heat and pressure. Temperature adjustment of the fixing unit 154 is performed by the CPU 141 of the CPU board-for-printer 140 performing calculation processing of a power supply control program called by the print engine control program, and controlling the output of the power supply 160. In addition, the print engine 150 includes the fan 155 for suppressing an increase in the temperature due to heat generated by the fixing unit 154, and the like. The fan 155 is also operated by the CPU 141 controlling the output of the power supply 160, similar to the temperature adjustment of the fixing unit 154.

In the image forming apparatus 100 according to this embodiment, calculation processing of the print engine control program and the power supply control program is performed by the same CPU 141, and determination regarding an operation of the power supply control program is made based on the print engine control program. It is desirable that the operations of the power supply 160 are controlled while being aware of the operations of the print engine 150. As a result of the print engine control program controlling both the operations of the print engine 150 and power supply control program (in other words, the power supply 160), the power supply 160 can be controlled more easily and accurately. In addition, even if a problem occurs in the control apparatus 110, or the like, the print engine 150 and the power supply 160 can be controlled, and thus, it is possible to prevent the occurrence of a fire due to heat generated by the fixing unit 154, and the like.

Remote Operation

Next, an operation in the case of executing a shutdown of the image forming apparatus 100 or a restart (reboot) of the image forming apparatus 100 from the computer 170, which is an external terminal, via a network will be described. When the internet protocol (IP) address of the image forming apparatus 100 is accessed from a Web browser installed in the computer 170 using HTTP, the CPU 111 of the control apparatus 110 receives an HTTP request via the NIC 112. The CPU 111 performs calculation processing of a remote user interface (RUI) program of the controller, and, as a result, an HTTP response is transmitted to the computer 170. Accordingly, a remote user interface (RUI) 300 is displayed on the Web browser of the computer 170. When the user performs an operation, such as clicking on the RUI 300 displayed on the Web browser, an HTTP request is transmitted from the computer 170 to the control apparatus 110 via the network. The CPU 111 returns an HTTP response to the computer 170, and causes the Web browser to display a new dialog box. The user can shut down or restart the image forming apparatus 100 by performing an operation on the RUI 300 displayed on the Web browser.

Screen Transition

Next, screen transition when executing a shutdown or restart via a network through an operation performed on the RUI 300 displayed on the Web browser will be described with reference to FIGS. 2 to 6. Screen transition illustrated here is an example, and the present invention is not limited thereto. A screen is generated in accordance with screen information (html, or Hypertext Markup Language) that the image forming apparatus 100 provides to the Web browser of the computer 170 in accordance with access from the Web browser.

Figure 2:
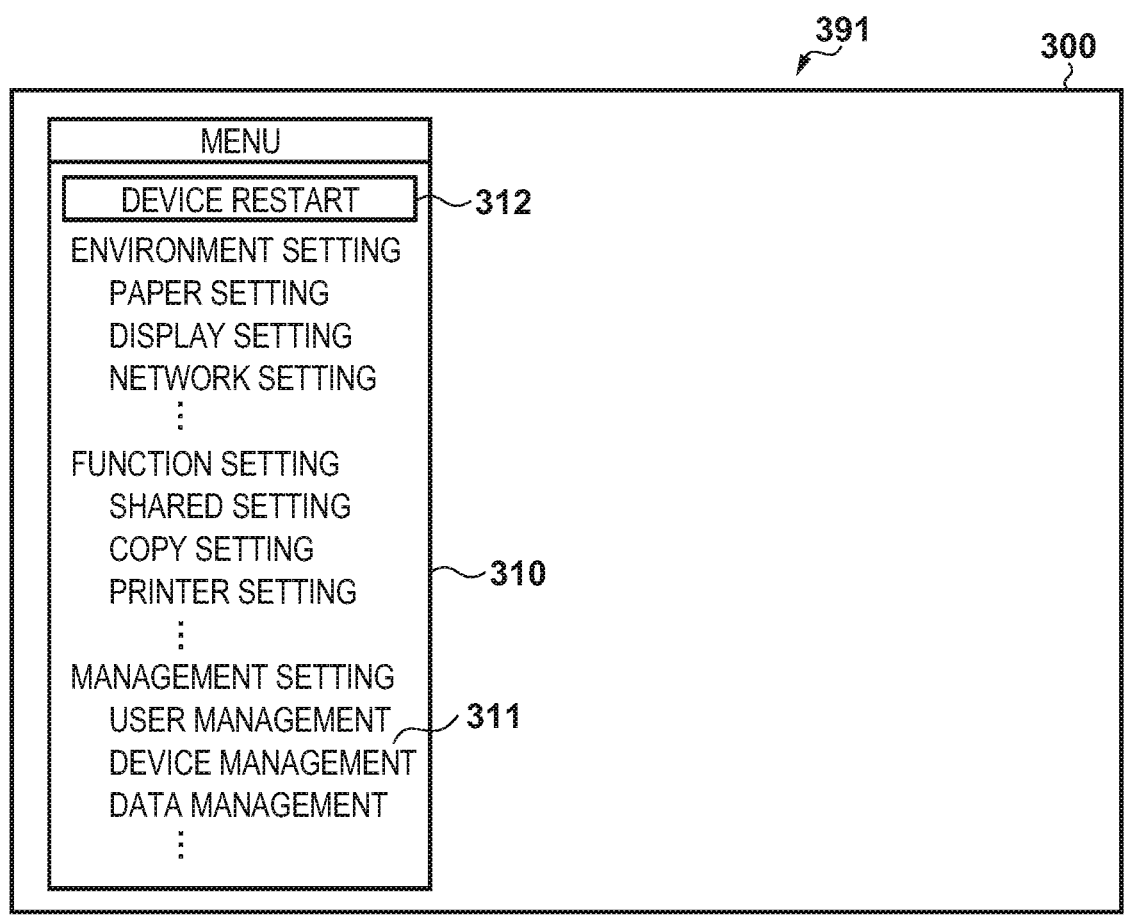
FIG. 2 is a diagram showing a screen of a remote user interface (RUI) of an image forming apparatus according to an embodiment.

When the user accesses the image forming apparatus 100 from the Web browser, the RUI 300, in a state indicated by 391 in FIG. 2, is displayed on the Web browser. At this time, the image forming apparatus 100 may perform log-in authentication. A menu 310 is displayed in the left portion of the RUI 300. In the case of executing a shutdown via the network, an operation is performed on "device management" 311. When an operation is performed on "device management" 311, a device management dialog box 320 is displayed in the right portion of the RUI 300 as indicated by reference numeral 392 in FIG. 3. In the device management dialog box 320, setting items and instruction items related to device management are displayed in a selectable manner, and "remote shutdown" 321 is included as an instruction item.

Figure 3:
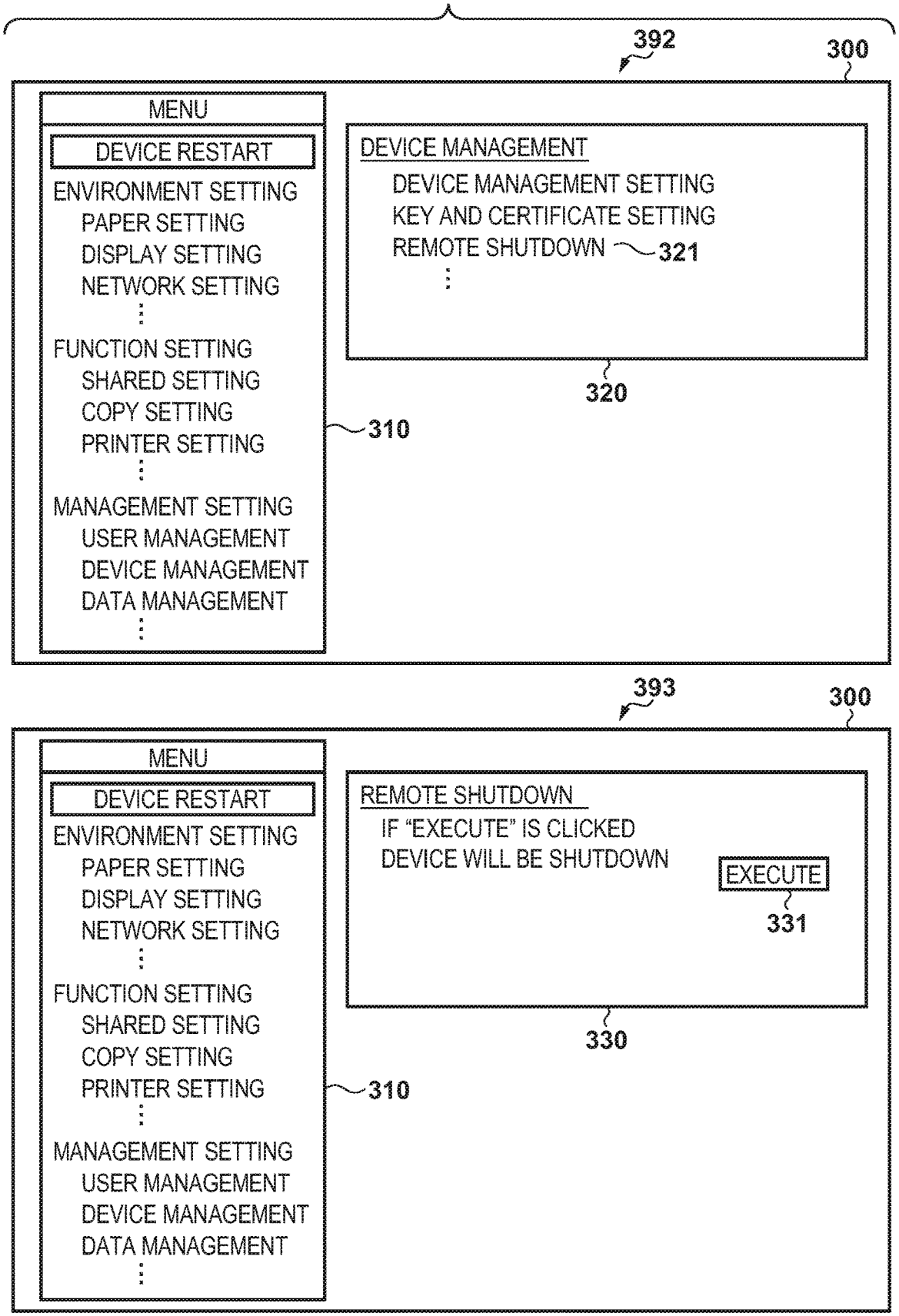
FIG. 3 is a diagram showing a screen of an RUI of an image forming apparatus according to an embodiment.

When an operation is performed on "remote shutdown" 321, a remote shutdown dialog box 330 is displayed as indicated by reference numeral 393 in FIG. 3. The remote shutdown dialog box 330 includes an execution button 331 for instructing remote shutdown. When an operation is performed on the execution button 331, a shutdown execution confirmation dialog box 340 is displayed as indicated by reference numeral 394 in FIG. 4. The execution confirmation dialog box 340 includes an OK button 341 for making the final instruction to execute a remote shutdown, and a cancel button 342 for cancelling the execution of a remote shutdown.

Here, when an operation is performed on the OK button 341, a shutdown request is transmitted to the image forming apparatus 100 via the network, and a message 350 indicating that a shutdown has been executed is displayed in the right portion of the RUI 300 as indicated by reference numeral 395 in FIG. 4. On the other hand, when an operation is performed on the cancel button 342, the screen transitions to a state 391 shown in FIG. 2. Control may be performed such that, as the operation when the cancel button 342 is clicked, the screen transitions to the states indicated by reference numerals 392 and 393 in FIG. 3.

In the case in which a restart is executed via the network, an operation is performed on "device restart" 312 in the menu 310 shown in a state indicated by reference numeral 391 in FIG. 2. When an operation is performed on "device restart" 312, a device restart dialog 360 is displayed as indicated by reference numeral 396 in FIG. 5. The device restart dialog 360 includes an execution button 361 for instructing restarting of a device.

Figure 5:
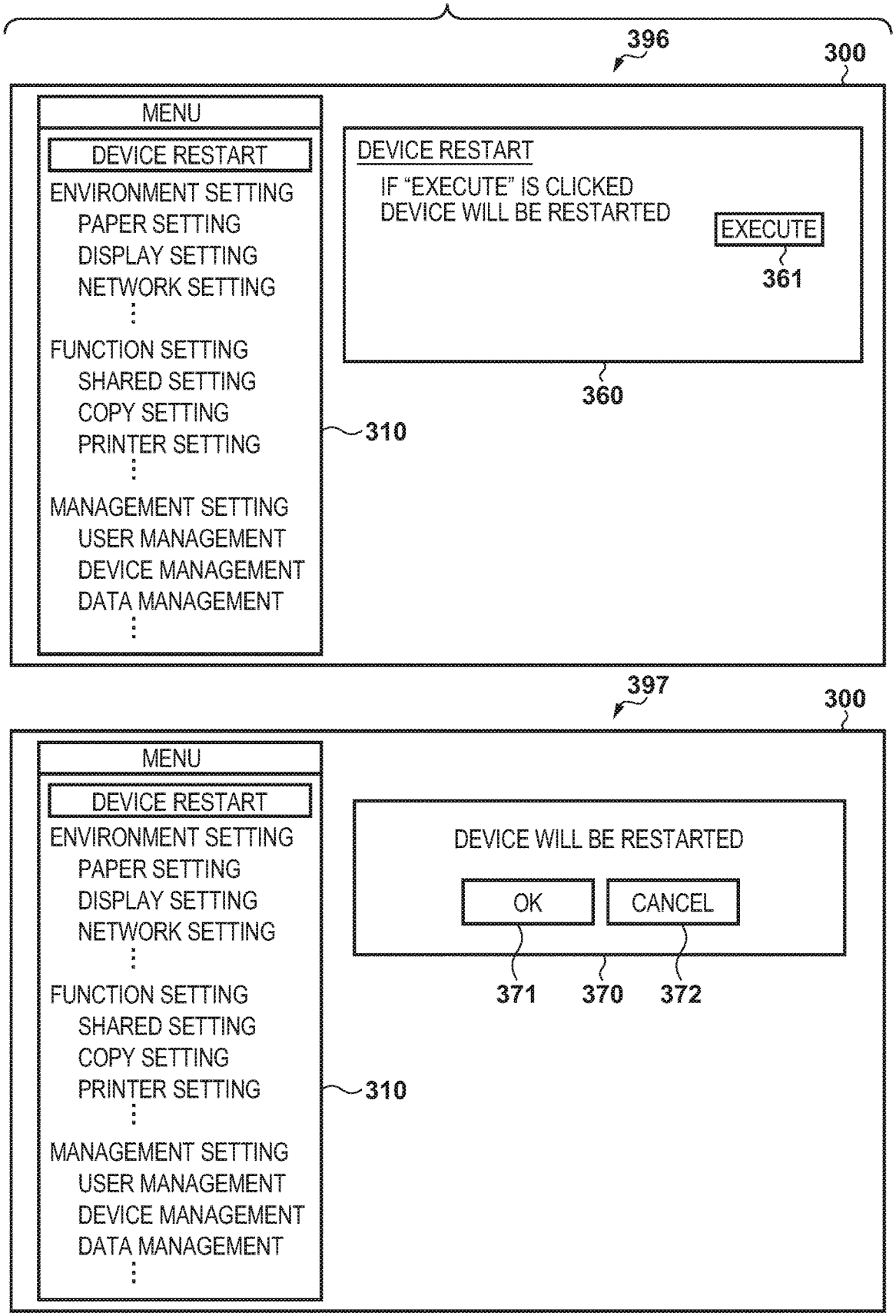
FIG. 5 is a diagram showing a screen of an RUI of an image forming apparatus according to an embodiment.

When an operation is performed on the execution button 361, a restart execution confirmation dialog 370 is displayed as indicated by reference numeral 397 in FIG. 5. The execution confirmation dialog 370 includes an OK button 371 for making a final instruction to perform a restart and a cancel button 372 for cancelling the restart. Here, when an operation is performed on the OK button 371, a restart request is transmitted to the image forming apparatus 100 via the network, and a message 380 indicating that restart has been executed is displayed in the right portion of the RUI 300 as indicated by reference numeral 398 in FIG. 6. On the other hand, when an operation is performed on the cancel button 372, the screen transitions to the state 391 shown in FIG. 2. Control may be performed such that, as the operation, when an operation is performed on the cancel button 372, the screen transitions to a state indicated by reference numeral 396 in FIG. 5.

Note that, in FIGS. 2 to 6, by performing an operation on an item in the menu 310 displayed in the left portion of the RUI 300, the screen may transition to a dialog box corresponding to the item regardless of whether the screen was in any of the states shown in FIGS. 2 to 6.

Shutdown Procedure

Figure 7:
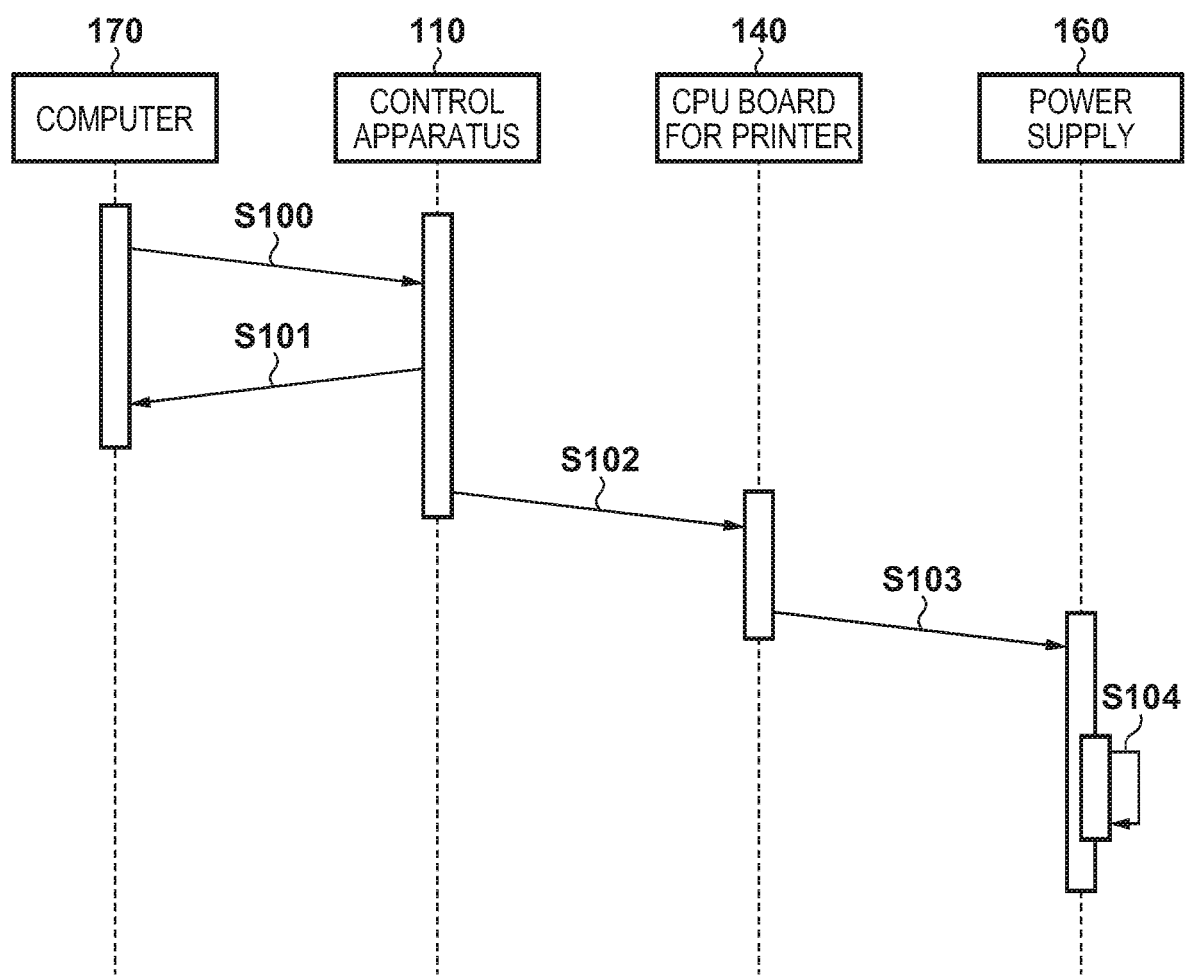
FIG. 7 is a sequence diagram showing operations when an image forming apparatus according to an embodiment receives a shutdown request from an RUI.

Next, an operation of the image forming apparatus 100 performed when a shutdown request is transmitted from the computer 170 to the image forming apparatus 100 will be described in detail with reference to FIG. 7. In the control apparatus 110, as a result of the CPU 111 operating in accordance with firmware stored in the non-volatile memory 115, the controller is running on the CPU 111. The image forming apparatus 100 and the computer 170 are connected via a network such that HTTP communication is possible.

In step S100, the computer 170 transmits a shutdown request to the control apparatus 110 in accordance with an operation performed by the user on the RUI 300 displayed on the Web browser of the computer 170. The control apparatus 110 receives the shutdown request via the NIC 112. When the control apparatus 110 receives the shutdown request, the CPU 111 operates in accordance with a RUI program of the controller, and interprets the shutdown request.

In step S101, the CPU 111 transmits an HTTP response to the computer 170, and displays, on the Web browser, a dialog box including a message indicating that a shutdown has been executed (see 395 in FIG. 4). Subsequently, in step S102, the CPU 111 executes calculation processing of the print engine communication program called by the RUI program, and transmits the shutdown request from the control apparatus 110 to the CPU board-for-printer 140 via the printer I/F 117.

In step S103, the CPU 141 of the CPU board-for-printer 140 executes calculation processing of the print engine control program, and receives the shutdown request, and a power supply control program is instructed by the print engine control program to execute a shutdown. In step S104, the CPU 141 operates in accordance with the power supply control program, and executes shutdown by operating a port of the power supply 160. Due to the above operation, power supply to the image forming apparatus 100 is stopped, and the image forming apparatus 100 stays in a power supply off state.

Restart Procedure

Figure 8:
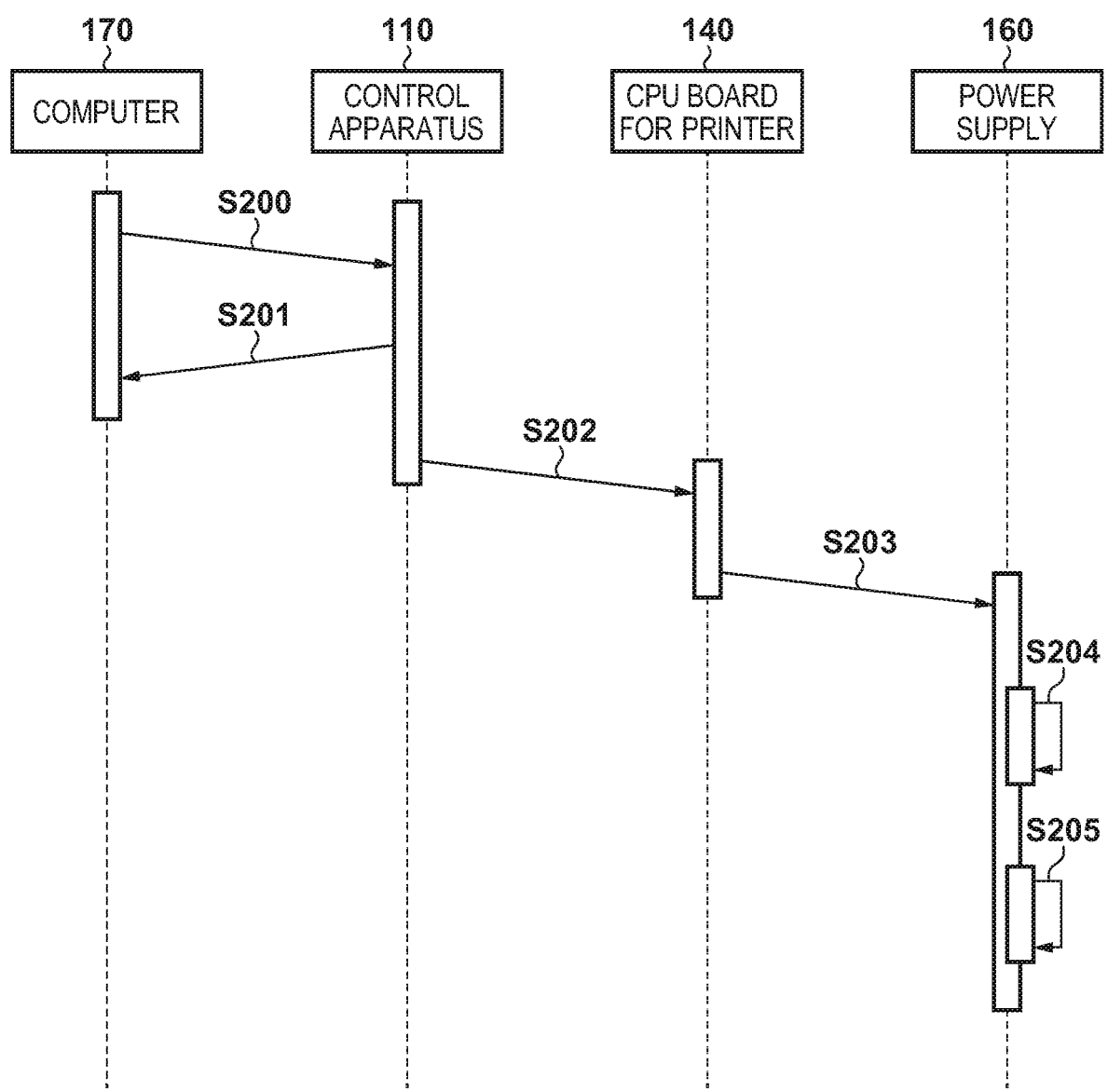
FIG. 8 is a sequence diagram showing operations when an image forming apparatus according to an embodiment receives a restart request from an RUI.
Figure 9:
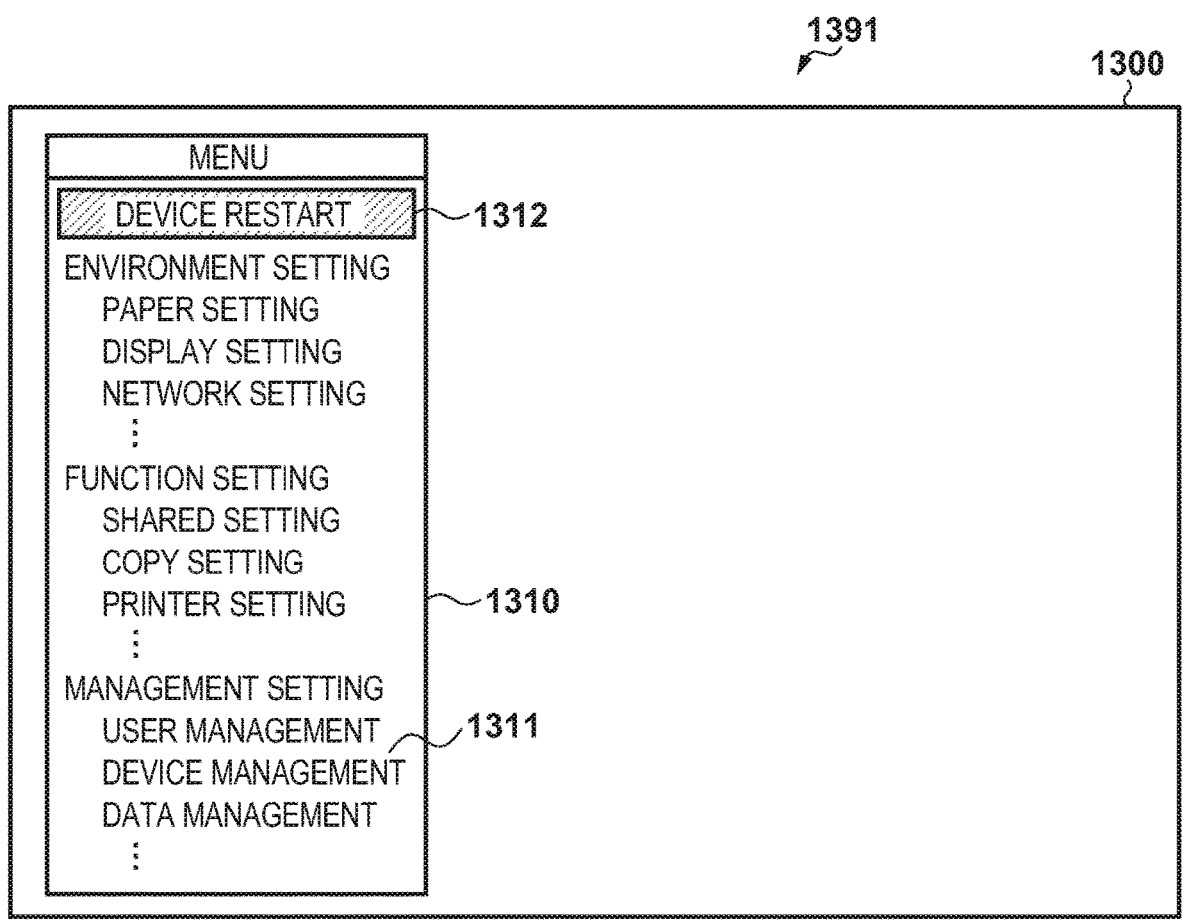
FIG. 9 is a diagram showing a screen of an RUI of an image forming apparatus according to an embodiment.
Figure 12:
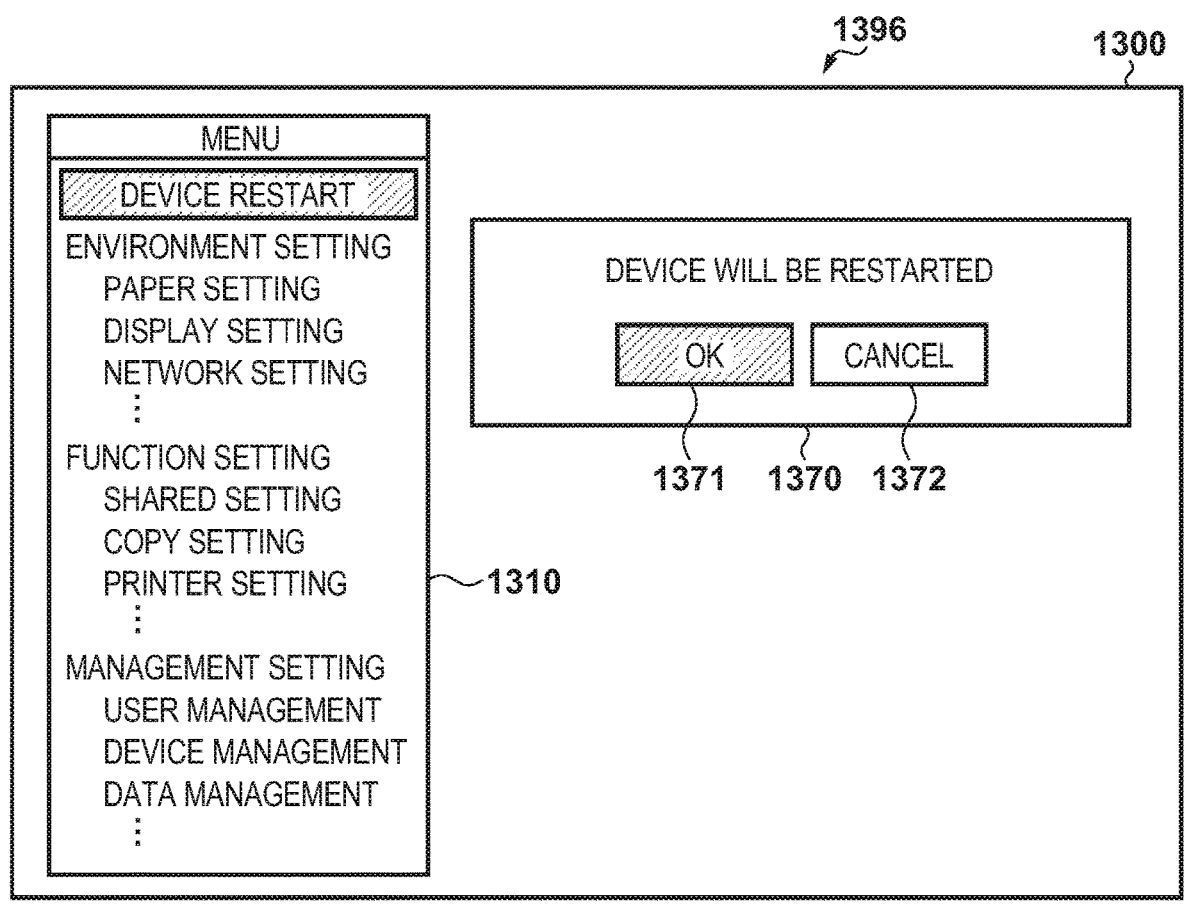
FIG. 12 is a diagram showing a screen of an RUI of an image forming apparatus according to an embodiment.

Next, operations of the image forming apparatus 100 when a restart request is transmitted from the computer 170 to the image forming apparatus 100 will be described in detail with reference to FIG. 8.

In step S200, as a result of the user performing an operation on the RUI 300 displayed on the Web browser of the computer 170, a restart request is transmitted from the computer 170 to the control apparatus 110. The control apparatus 110 receives the restart request via the NIC 112. When the control apparatus 110 receives the restart request, the CPU 111 operates in accordance with the RUI program of the controller, and interprets the restart request.

Figure 6:
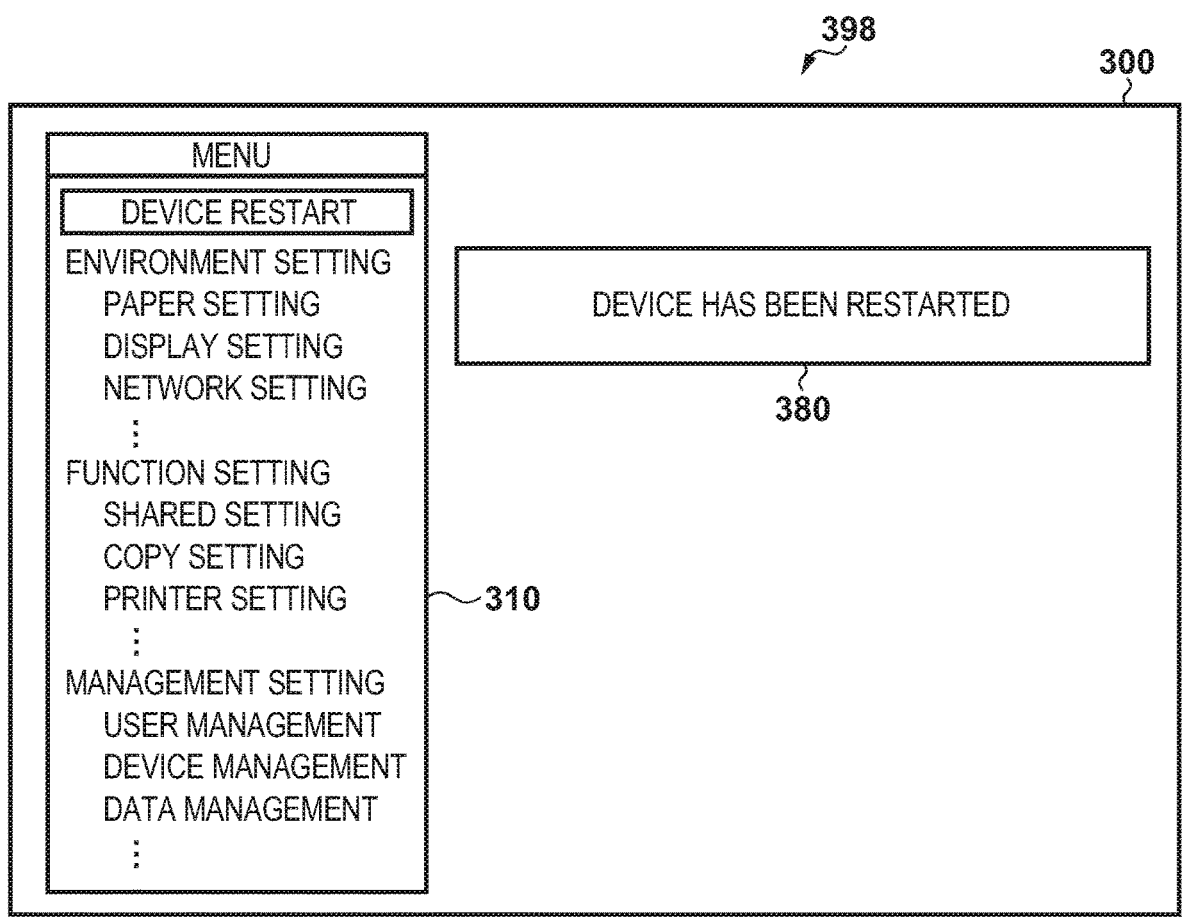
FIG. 6 is a diagram showing a screen of an RUI of an image forming apparatus according to an embodiment.

In step S201, the CPU 111 transmits an HTTP response to the computer 170, and displays, on the Web browser, a dialog box including a message indicating that a restart has been executed (see 398 in FIG. 6).

In step S202, the CPU 111 performs calculation processing of the print engine communication program called by the RUI program, and transmits a restart request from the control apparatus 110 to the CPU board-for-printer 140 via the printer I/F 117.

In step S203, the CPU 141 performs the calculation processing of the print engine control program, and receives the restart request, and the print engine control program is instructed by the power supply control program to execute a restart.

In step S204, the CPU 141 of the CPU board-for-printer 140 operates in accordance with the power supply control program, and instructs the power supply 160 to perform a restart by operating a port of the power supply 160. After shutting down in step S204, the image forming apparatus 100 is automatically booted up in step S205.

As described above, the image forming apparatus (printing apparatus) according to this embodiment has a power supply that supplies power to the constituent elements of the printing apparatus and a second controller (a system controller) that receives an instruction related to power supply control of the printing apparatus from an external terminal. Furthermore, this printing apparatus includes a first controller (engine controller) that controls the operations of the print engine, and controls the supply and shutoff of power that is output from the power supply to constituent elements. Upon receiving an instruction from an external terminal, the second controller notifies the first controller of the instruction, and the first controller controls the power supply in accordance with the instruction. According to this embodiment, this makes it possible to suitably shutdown or to restart a printing apparatus that has a configuration in which the print engine control program and the power supply control program are processed by the same CPU, from a remote position.

The present invention is not limited to the above embodiment, and various modifications can be made. In the above embodiment, an MFP is used as an example of a printing apparatus, but a printing apparatus to which the present invention can be applied is not limited to an MFP. For example, the present invention can also be applied to a so-called single function printer (SFP) that does not have a scan engine and only has a print engine.

In addition, in the description of this embodiment, the controller and the print engine control program operate on different CPU boards, but a configuration may be adopted in which the controller and the print engine control program operate on different CPUs on the same CPU board.

Moreover, in this embodiment, a shutdown request and a restart request made through an operation performed on the RUI have been described as examples, but the present invention is not limited thereto. The present invention can also be applied to a case in which a shutdown request or a restart request made via a network is transmitted from an application installed in an external terminal, a web application on a server, or the like, using another protocol. A simple network management protocol (SNMP) manager is known as an example of a representative application. An SNMP manager is an application for monitoring a device connected to the network using an SNMP command that complies with a protocol in which a Management Information Base (MIB) format is used. The present invention can also be applied to a case in which a shutdown request or a restart request are transmitted from an SNMP manager to the image forming apparatus 100 using an SNMP command.

Second Embodiment

A second embodiment of the present invention will be described below. Note that description of portions similar to those in the first embodiment above is omitted. The hardware configuration of the second embodiment is the same as the first embodiment above, and thus, a description thereof is omitted.

In an image forming apparatus 100 of the present invention, control of supply of power, such as turning a power supply 160 ON/OFF, is managed by a CPU board-for-printer 140 different from a control apparatus 110. In the case in which the control apparatus 110 receives a shutdown request or a restart request via a network, information indicating the request needs to be transmitted to the CPU board-for-printer 140. Therefore, if a communication error occurs between the control apparatus 110 and the CPU board-for-printer 140, a shutdown request or a restart request cannot be transmitted from the control apparatus 110 to the CPU board-for-printer 140. Accordingly, even if the control apparatus 110 receives a shutdown request or a restart request via a network, an image forming apparatus 100 cannot be shutdown or restarted.

In view of this, according to this embodiment, in the image forming apparatus 100, the communication state of a print engine between the control apparatus 110 and the CPU board-for-printer 140 is stored in a non-volatile memory 115 of the control apparatus 110, as the operation state of the CPU board-for-printer 140. The communication state of the print engine is set to TRUE in a normal state. In the case in which a communication error has occurred between the control apparatus 110 and the CPU board-for-printer 140, a CPU 111 operates in accordance with a print engine communication program, and updates the communication state of the print engine to FALSE. On the other hand, in the case in which a communication error between the control apparatus 110 and the CPU board-for-printer 140 is resolved, the CPU 111 operates in accordance with the print engine communication program, and updates the communication state of the print engine to TRUE.

The image forming apparatus 100 according to this embodiment has a function of prohibiting transmission of a shutdown request and a restart request from an RUI 1300 in the case in which a communication error has occurred and a function of preventing the execution of a shutdown and the execution of a restart even in the case in which a request was transmitted. Accordingly, in the case in which shutdown or restart cannot be executed from the RUI 1300 despite the intent of the user, it is possible to notify the user that shutdown or restart cannot be executed.

Screen transition of the RUI 1300 in the case in which a communication error has occurred between the control apparatus 110 and the CPU board-for-printer 140 will be described with reference to FIGS. 9 to 12. If a communication error has not occurred, no particular process is performed on dialog boxes of the RUI 1300, and thus, the dialogs of the RUI 1300 are the same as those in the first embodiment above (FIGS. 2 to 6).

When an HTTP request is transmitted, the CPU 111 operates in accordance with an RUI program of a controller. First, the CPU 111 confirms whether or not a dialog box to be sent to the Web browser includes a control related to shutdown or restart. If a control related to shutdown or restart is not included, the CPU 111 displays the dialog box in the RUI 1300 on the Web browser.

On the other hand, if a dialog box to be sent to the Web browser includes a control related to shutdown or restart, the CPU 111 confirms the communication state of the print engine stored in the non-volatile memory 115. If the communication state of the print engine is TRUE, the CPU 111 displays the dialog box in the RUI 1300 on the Web browser without performing any particular process. Accordingly, the dialog boxes shown in FIGS. 2 to 6 with reference to which the first embodiment has been described above are displayed in the RUI 1300 on the Web browser as is. If the communication state of the print engine is FALSE, however, the CPU 111 displays, in the RUI 1300 on the Web browser, a dialog box processed such that shutdown or restart cannot be executed. For example, in a menu 1310 in a state indicated by reference numeral 1391 in FIG. 9, display control is performed such that a predetermined item, for example, "device restart" 1312, is displayed in a grayed out manner, and cannot be selected.

In addition, in a device management dialog box 1320 in a state indicated by reference numeral 1392 in FIG. 10, display control is performed such that "remote shutdown" 1321 is displayed in a grayed out manner, and cannot be selected. In a remote shutdown dialog box 1330 in a state indicated by reference numeral 1393 in FIG. 10, display control is performed such that an execution button 1331 is displayed in a grayed out manner, and cannot be selected. In a shutdown execution confirmation dialog box 1340 in a state indicated by reference numeral 1394 in FIG. 11, display control is performed such that an OK button 1341 is displayed in a grayed out manner, and cannot be selected. Furthermore, in a device restart dialog box 1360 in a state indicated by reference numeral 1395 in FIG. 11, display control is performed such that an execution button 1361 is displayed in a grayed out manner, and cannot be selected. In a restart execution confirmation dialog box 1370 in a state indicated by reference numeral 1396 in FIG. 12, display control is performed such that an OK button 1371 is displayed in a grayed out manner, and cannot be selected.

As described above, in this embodiment, in the state in which a communication error has occurred between the control apparatus 110 and the CPU board-for-printer 140, a control related to shutdown or restart is displayed in a grayed out manner, and cannot be selected. The present invention is not, however, limited thereto, and, for example, a target control may be hidden.

Note that, in the above embodiment, whether or not a control related to shutdown or restart is included in the dialog box is confirmed, and, after that, only in the case in which a control related to shutdown or restart is included, the communication state of the print engine is confirmed. A configuration may be adopted, however, in which, before confirmation is made as to whether or not a control related to shutdown or restart is included in the dialog box, the communication state of the print engine is confirmed. In addition, it is not necessary to apply all of these controls, and the like. A configuration may be adopted in which only a portion of these controls and the like is applied.

Shutdown Procedure

Next, operations of the image forming apparatus 100 when a shutdown request is transmitted from a computer 170 to the image forming apparatus 100 will be described in detail with reference to FIGS. 13 and 14.

Figure 13:
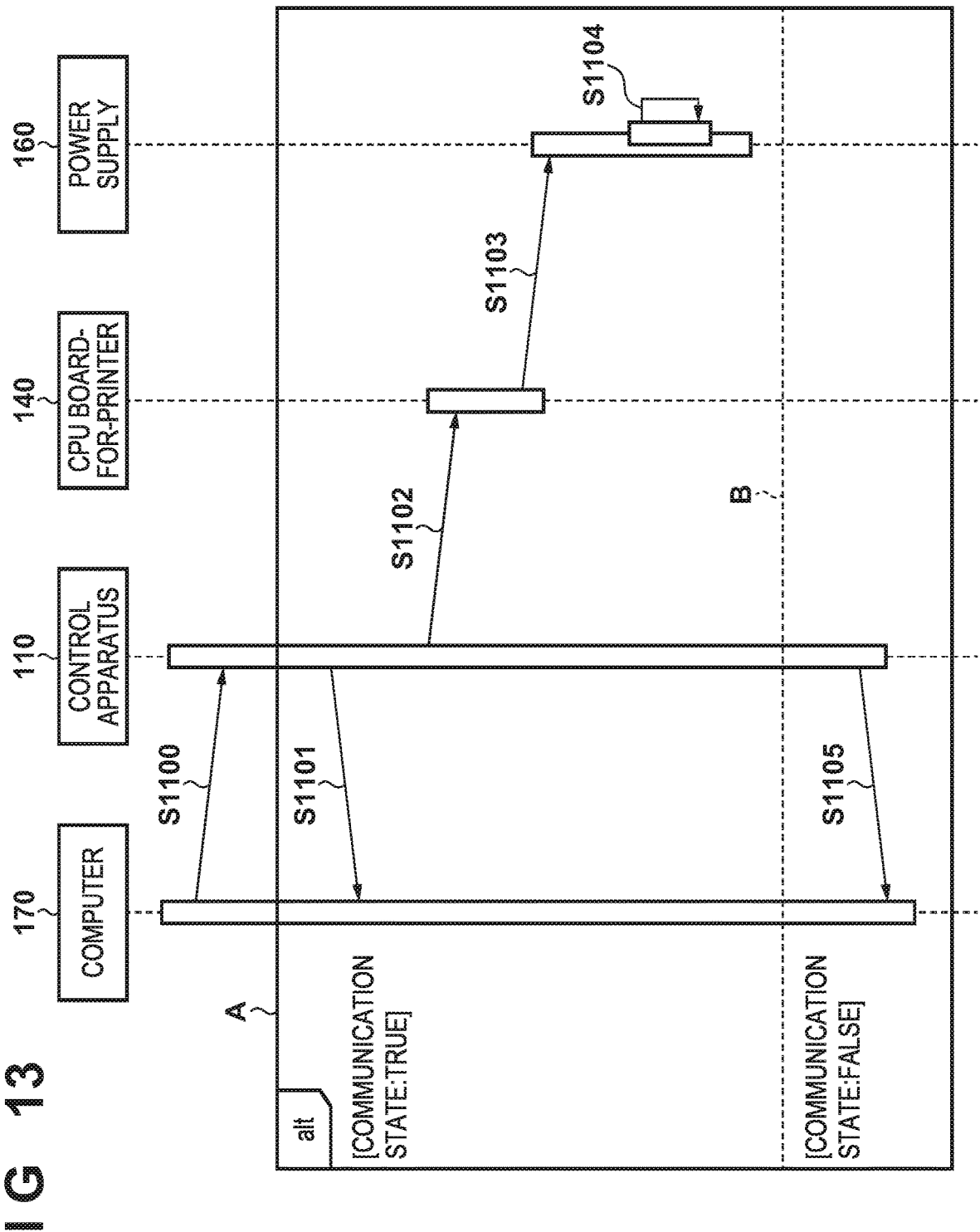
FIG. 13 is a sequence diagram showing operations when an image forming apparatus according to an embodiment receives a shutdown request from an RUI.
Figure 14:
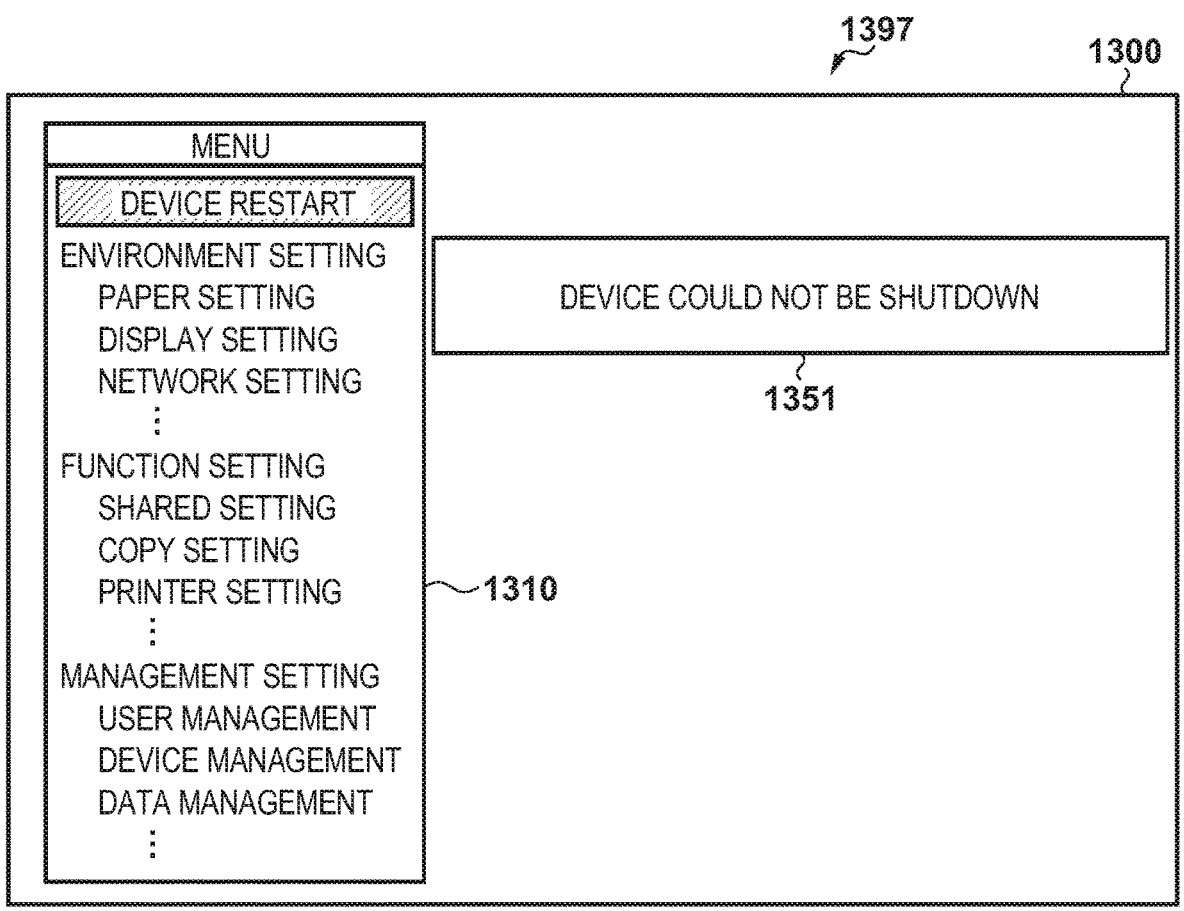
FIG. 14 is a diagram showing a screen of an RUI of an image forming apparatus according to an embodiment.

In step S1100 in FIG. 13, as a result of the user performing an operation on the RUI 1300 displayed in the Web browser of the computer 170, a shutdown request is transmitted from the computer 170 to the control apparatus 110. The control apparatus 110 receives the shutdown request via an NIC 112. When the control apparatus 110 receives the shutdown request, the CPU 111 operates in accordance with the RUI program of the controller, and interprets the shutdown request.

In FIG. 13, a frame indicated by reference sign A indicates a condition branch. The main difference from the first embodiment above is that the communication state of the print engine between the control apparatus 110 and the CPU board-for-printer 140 is confirmed, and thereby a condition branch is generated. In the confirmation of the communication state, the control apparatus 110 confirms information indicating the above communication state stored in the non-volatile memory 115 of the control apparatus 110. In the case in which the communication state of the print engine stored in the non-volatile memory 115 is TRUE (the communication state between the control apparatus 110 and the CPU board-for-printer 140 is normal), the sequence above the dotted line B is performed. On the other hand, if the communication state of the print engine stored in the non-volatile memory 115 is FALSE (the communication state between the control apparatus 110 and the CPU board-for-printer 140 is a communication error), the sequence below the dotted line B is performed.

The communication state of the print engine is confirmed, and if the communication state is normal, a shutdown request can be transmitted from the control apparatus 110 to the CPU board-for-printer 140. Thus, the image forming apparatus 100 performs the same operations as those in the first embodiment above. The operations of steps S1101 to S1104 in FIG. 13 are respectively the same as those of steps S101 to S104 in FIG. 7. Therefore, a detailed description thereof is omitted.

If a communication error occurs, a shutdown request cannot be transmitted from the control apparatus 110 to the CPU board-for-printer 140. Accordingly, the image forming apparatus 100 cannot be shut down via a network. In this case, the sequence below the dotted line B is performed. Accordingly, in step S1105, the CPU 111 of the control apparatus 110 displays a dialog box including a message 1351 indicating that shutdown could not be executed, in the Web browser of the computer 170 (the RUI 1300), as in a state indicated by reference numeral 1397 in FIG. 14.

Restart Procedure

Next, operations of the image forming apparatus 100 when a restart request is transmitted from the computer 170 to the image forming apparatus 100 will be described with reference to FIGS. 15 and 16.

Figure 15:
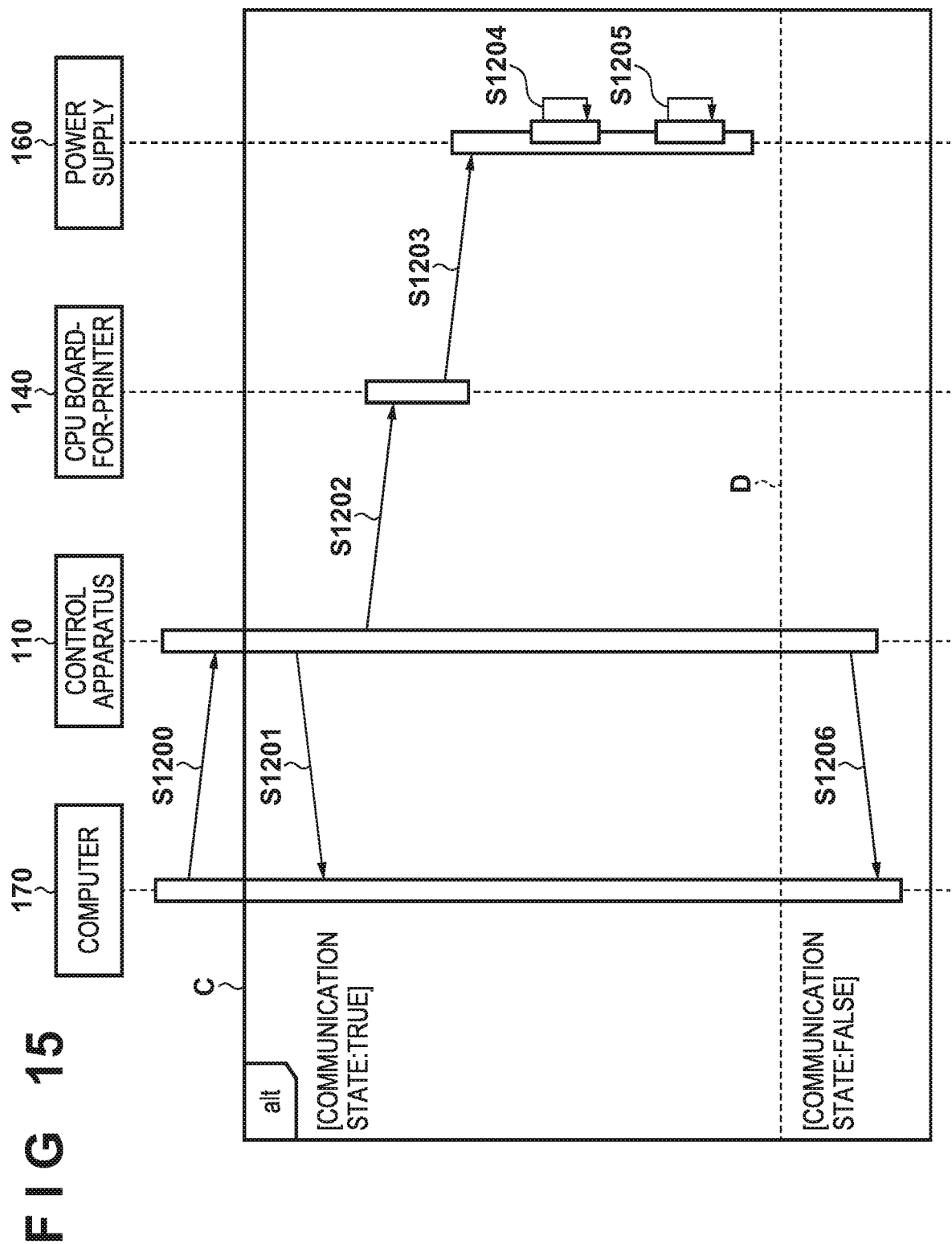
FIG. 15 is a sequence diagram showing operations when an image forming apparatus according to an embodiment receives a restart request from an RUI.
Figure 16:
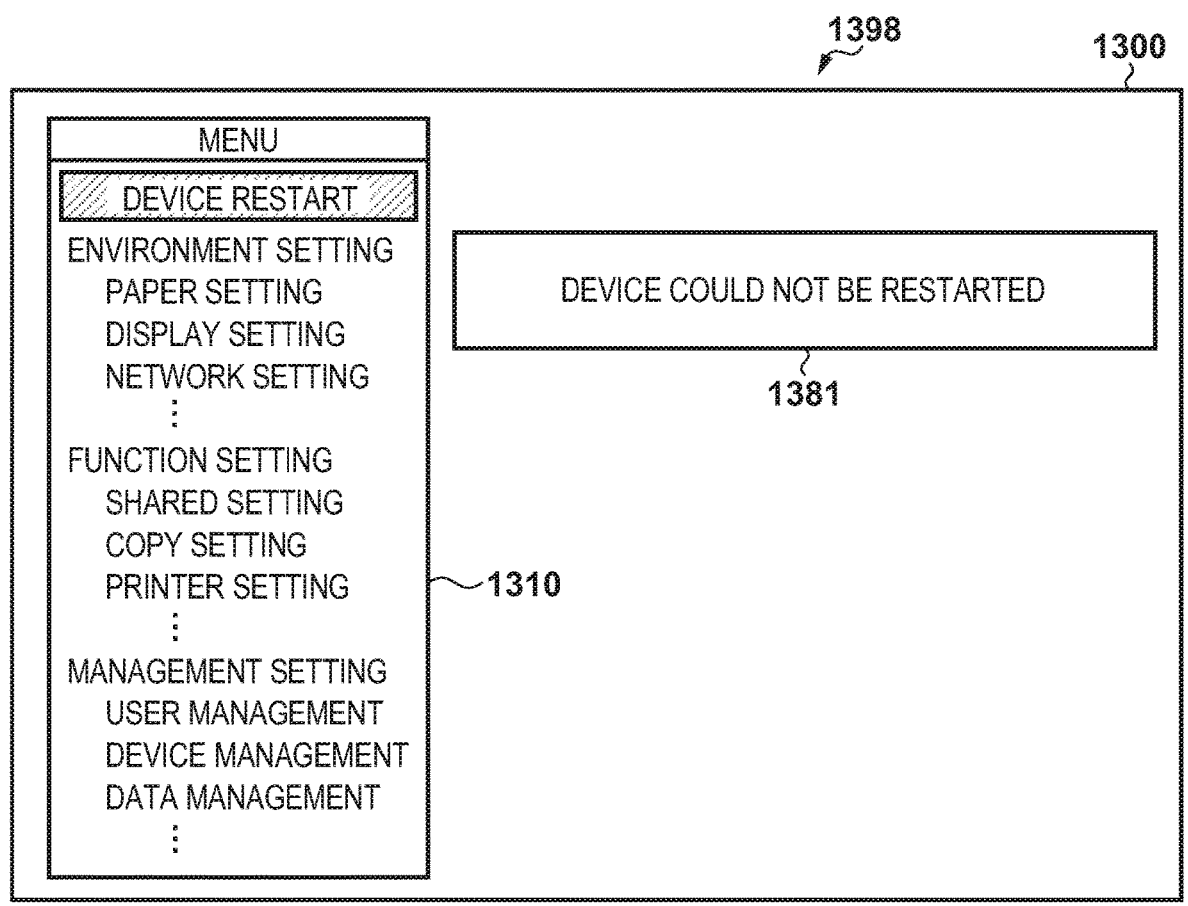
FIG. 16 is a diagram showing a screen of an RUI of an image forming apparatus according to an embodiment.

In step S1200 in FIG. 15, as a result of the user performing an operation on the RUI 1300 displayed in the Web browser of the computer 170, a restart request is transmitted from the computer 170 to the control apparatus 110. The control apparatus 110 receives the restart request via the NIC 112. When the control apparatus 110 receives the restart request, the CPU 111 operates in accordance with the RUI program of the controller, and interprets the restart request.

In FIG. 15, a frame indicated by reference numeral C indicates a condition branch. In the case in which the communication state of the print engine is TRUE (the communication state between the control apparatus 110 and the CPU board-for-printer 140 is normal), the sequence above the dotted line D is performed. On the other hand, in the case in which the communication state of the print engine is FALSE (the communication state between the control apparatus 110 and the CPU board-for-printer 140 is a communication error), the sequence below the dotted line D is performed.

The communication state of the print engine is confirmed, and if the communication state is normal, a restart request can be transmitted from the control apparatus 110 to the CPU board-for-printer 140. Therefore, the image forming apparatus 100 performs operations similar to those in the first embodiment above. In other words, operations in steps S1201 to S1205 in FIG. 15 are the same as those in steps S201 to S205 in FIG. 8. Therefore, a detailed description thereof is omitted.

In the case in which a communication error has occurred, a restart request cannot be transmitted from the control apparatus 110 to the CPU board-for-printer 140. Accordingly, the image forming apparatus 100 cannot be restarted via a network. In this case, the sequence below dotted line D is performed. Specifically, in step S1206, the CPU 111 of the control apparatus 110 displays, in the Web browser of the computer 170 (the RUI 1300), a dialog box including a message 1381 indicating that a restart could not be executed, as in a state indicated by reference numeral 1398 in FIG. 16.

As described above, the printing apparatus (image forming apparatus) according to this embodiment, having a configuration in which the control program of the print engine and the power supply control program are processed by the same CPU, shutdown or restart can be carried out from a remote position. Furthermore, in the case in which a communication error occurs between the control apparatus 110 and the CPU board-for-printer 140, and a shutdown or restart cannot be executed via the network, it is possible to notify the user of the above, and improve the convenience of the printing apparatus.

The present invention is not limited to the above embodiment, and various modifications can be made. For example, in the above embodiment, the communication state between the control apparatus 110 and the CPU board-for-printer 140 is confirmed by a communication program of the print engine (specifically, the CPU 141), and the communication state of the print engine is updated. In addition, the RUI program (specifically, the CPU 111) references the communication state of the print engine. On the other hand, a configuration may be adopted in which, before the communication state of the print engine is updated, the RUI program directly obtains the communication state between the control apparatus 110 and the CPU board-for-printer 140 from the communication program of the print engine.

Moreover, in the above embodiment, a function of prohibiting transmission of a shutdown request and a restart request from the RUI when a communication error occurs and a function of preventing execution of shutdown and restart even if a request is transmitted have been described. A configuration may be adopted in which, in addition to a communication error, confirmation is made as to whether or not the operation state is a specific state in which specific processing or a specific job is being executed, and if the operation state is a specific state, similar to the above embodiment, the CPU board-for-printer 140 that is an engine controller is not notified of an instruction related to power supply control from an external terminal. For example, a configuration may also be adopted in which a function of preventing transmission of a shutdown request and a restart request from the RUI while a facsimile is being received. Therefore, in the case of these configurations, it is desirable that information regarding whether or not the operation state of the CPU board-for-printer 140 is the above-described specific state is stored in the non-volatile memory 115. As a matter of course, a configuration may also be adopted in which the CPU board-for-printer 140 responds to an inquiry from the control apparatus 110 with information indicating the operation state.

Other Embodiments

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-Ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:
a power supply that supplies power to hardware components in the printing apparatus;
a print engine that prints an image;
a first controller that controls the print engine and controls the power supply; and
a second controller that communicates with the first controller, and receives a power control instruction related to power control of the printing apparatus from an external terminal;
wherein the second controller confirms whether or not a communication state between the first controller and the second controller is a state in which a communication error has occurred,
wherein the second controller receives the power control instruction from the external terminal; and then
notifies the first controller of the power control instruction related to power control of the printing apparatus based on confirmation that the communication state is not the state in which the communication error has occurred, or
notifies the external terminal of information indicating that the printing apparatus is not turned off based on confirmation that the communication state is the state in which the communication error has occurred, and
wherein the first controller controls, in accordance with the power control instruction received from the second controller, the power supply to stop supply of the power to at least the first controller and the second controller.

2. The printing apparatus according to claim 1, wherein the first controller outputs, to the print engine, drive control signals to drive print hardware components inside of the print engine.

3. The printing apparatus according to claim 1, wherein the first controller and the second controller are implemented on different circuit boards and are connected with each other via communication cables.

4. The printing apparatus according to claim 1, wherein the power supply supplies power to the print engine, the first controller, and the second controller.

5. The printing apparatus according to claim 1, wherein a voltage of power that the power supply supplies to the print engine is greater than a voltage of power that the power supply supplies to the first controller.

6. The printing apparatus according to claim 1, wherein the second controller receives print data from an external device, generates image data based on the received print data, and transfers the generated image data to the first controller, and the print engine prints an image using the received image data.

7. The printing apparatus according to claim 1, further comprising a reader that reads a sheet to obtain an image of the sheet,
wherein the second controller controls the reader to read the sheet to obtain the image data, and transfers the image data to the first controller to print an image using the received image data.

8. The printing apparatus according to claim 1, wherein the second controller provides screen information for sending the power control instruction to a web browser of the external terminal.

9. The printing apparatus according to claim 1, further comprising a memory,
wherein the second controller confirms the communication state between the first controller and the second controller, stores information indicating the communication state in the memory, and refers to the information stored in the memory based on the power control instruction received from an external terminal.

10. The printing apparatus according to claim 1, wherein the second controller comprises a network interface and receives the power control instruction from the external apparatus, and
wherein, while the printing apparatus is in an off state, the network interface is disabled.

11. The printing apparatus according to claim 1, wherein, while the printing apparatus is in an off state, the power is not supplied to the printer engine, the first controller, and the second controller.

12. A method of controlling a printing apparatus that comprises a power supply that supplies power to a print engine that prints an image, a first controller that controls the print engine, and a second controller that communicates with the first controller and receives a power control instruction from an external terminal, the control method comprising:

confirming whether or not a communication state between the first controller and the second controller is a state in which a communication error has occurred;

receiving the power control instruction from the external terminal, and then notifying, using the second controller, the first controller of the power control instruction related to power control of the printing apparatus based on confirmation that the communication state is not the state in which the communication error has occurred, or notifying the external terminal of information indicating that the printing apparatus is not turned off based on confirmation that the communication state is the state in which the communication error has occurred, and controlling, using the first controller and in accordance with the power control instruction received from the second controller, the power supply to stop supply of the power to at least the first controller and the second controller.

13. The method according to claim 12, further comprising:

receiving, using the second controller, print data from an external computer, generating, using the second controller, image data based on the received print data, transferring, from the second controller, the generated image data to the first controller, and printing, using the print engine, an image using the received image data.

14. A printing apparatus comprising:

a power supply that supplies power to hardware components in the printing apparatus;

a print engine that prints an image;

a first controller that controls the print engine and controls the power supply; and a second controller that communicates with the first controller, and receives a power control instruction related to power control of the printing apparatus from an external terminal, wherein the second controller confirms whether or not a communication state between the first controller and the second controller is a state in which a communication error has occurred, wherein the second controller receives a request for a web screen to send the power control instruction, and then sends first web screen information to the external terminal based on confirmation that the communication state is the state in which the communication error has occurred, wherein the external terminal displays a first web screen that the power control of the printing apparatus cannot be used based on the first web screen information, and sends second web screen information to the external terminal based on confirmation that the communication state is not the state in which the communication error has occurred, wherein the external terminal displays a second web screen that the power control of the printing apparatus can be used based on the second web screen information.

15. The printing apparatus according to claim 14, wherein the second web screen includes a first item for performing a shutdown of the printing apparatus or performing a restart of the printing apparatus.

16. The printing apparatus according to claim 15, wherein the first web screen does not include the first item.

17. The printing apparatus according to claim 14, each of the first web screen and the second web screen are screens displayed on a web browser of the external terminal.

18. The printing apparatus according to claim 14, further comprising a memory, wherein the second controller confirms the communication state between the first controller and the second controller, and stores information indicating the communication state in the memory, and refers to the information stored in the memory based on the request received from the external terminal.

19. The printing apparatus according to claim 14, wherein the second controller receives print data from an external device, generates image data based on the received print data, and transfers the generated image data to the first controller, and the print engine prints an image using the received image data.

20. The printing apparatus according to claim 14, further comprising a reader that reads a sheet to obtain an image of the sheet, wherein the second controller controls the reader to read the sheet to obtain the image data, and transfers the image data to the first controller to print an image using the received image data.

21. A method of controlling a printing apparatus that comprises a print engine that prints an image, a power supply that supplies power to the print engine, a first controller that controls the print engine, and a second controller that communicates with the first controller and receives a power control instruction from an external terminal, the control method comprising:

confirming whether or not a communication state between the first controller and the second controller is a state in which a communication error has occurred, receiving a request for a web screen to send the power control instruction, sending first web screen information to the external terminal based on confirmation that the communication state is the state in which the communication error has occurred, wherein the external terminal displays a first web screen that the power control of the printing apparatus cannot be used based on the first web screen information, and sending second web screen information to the external terminal based on confirmation that the communication state is not the state in which the communication error has occurred, wherein the external terminal displays a second web screen that the power control of the printing apparatus can be used based on the second web screen information.

* * * * *